(12) United States Patent
Smalley

(10) Patent No.: US 7,017,703 B2
(45) Date of Patent: Mar. 28, 2006

(54) FOUR WHEEL TRACTION CONTROL VALVE

(75) Inventor: Ryan D. Smalley, Ames, IA (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 10/901,539

(22) Filed: Jul. 29, 2004

(65) Prior Publication Data

US 2005/0279560 A1 Dec. 22, 2005

Related U.S. Application Data

(60) Provisional application No. 60/581,882, filed on Jun. 22, 2004.

(51) Int. Cl.
F16D 31/08 (2006.01)

(52) U.S. Cl. .......................... 180/308; 701/69; 60/429; 60/471

(58) Field of Classification Search ................ 180/197, 180/242, 305, 307, 308; 60/429, 470, 471; 137/493.7, 587
See application file for complete search history.

(56) References Cited

U.S. PATENT DOCUMENTS

| | | | |
|---|---|---|---|
| 3,656,570 A | 4/1972 | Gortnar et al. | |
| 3,910,369 A | 10/1975 | Chichester et al. | |
| 4,494,624 A * | 1/1985 | Scheuerle et al. | 180/308 |
| 4,691,795 A * | 9/1987 | Wehmeyer et al. | 180/6.48 |
| 5,720,360 A * | 2/1998 | Clark et al. | 180/305 |
| 5,915,496 A | 6/1999 | Bednar et al. | |
| 6,098,738 A | 8/2000 | White | |
| 6,135,231 A | 10/2000 | Reed | |
| 6,276,468 B1 * | 8/2001 | Essig et al. | 108/6.2 |
| 6,305,486 B1 | 10/2001 | Polzin et al. | |
| 6,354,392 B1 | 3/2002 | Cousin et al. | |
| 6,662,895 B1 | 12/2003 | Bednar | |
| 6,749,037 B1 * | 6/2004 | Lindholdt | 180/242 |
| 6,935,454 B1 * | 8/2005 | Hauser et al. | 108/242 |
| 2003/0015367 A1 | 1/2003 | Miller | |
| 2004/0040774 A1 * | 3/2004 | Feldcamp | 180/308 |

* cited by examiner

Primary Examiner—Jeff Restifo

(57) ABSTRACT

A hydrostatic propulsion system includes a hydrostatic circuit fluidly connecting left front and right front motors in parallel with an outlet of a pump, left rear and right rear motors in parallel with an inlet of the pump, left front motor and right rear motor in series, and the right front motor and left rear motor in series. A valve system has a first relief valve line providing flow from a right rear motor inlet side to a left rear motor inlet side, and a second relief valve line providing flow from a left rear motor inlet side to a right rear motor inlet side. A first check valve line provides flow from a right rear motor outlet side to the right rear motor inlet side, and a second check valve line provides flow from a left rear motor outlet side to the left rear motor inlet side.

7 Claims, 4 Drawing Sheets

FOUR WHEEL TRACTION CONTROL VALVE

BACKGROUND OF THE INVENTION

The present invention relates to the field of vehicle propulsion systems. More particularly, the invention relates to a hydrostatic vehicle propulsion system consisting of a single, variable fluid displacement pump in conjunction with multiple fluid displacement motors, and a valve system to provide traction control functions.

The safe and efficient operation of fluid power systems, system components, and related equipment requires a means of controlling pressure. There are many types of automatic pressure control valves. Some of these automatic pressure control valves merely provide an escape for pressure that exceeds a set pressure; some only reduce the pressure to a lower pressure system or subsystem; and some keep the pressure in a system within a required range.

Some fluid power systems, even when operating normally, may temporarily develop excessive pressure; for example, when an unusually strong work resistance is encountered. Relief valves are used to control this excess pressure. Relief valves are automatic valves used on system lines and equipment to prevent over pressurization. Most relief valves simply lift (open) at a preset pressure and reset (shut) when the pressure drops slightly below the lifting pressure. They do not maintain flow or pressure at a given amount, but prevent pressure from rising above a specific level when the system is temporarily overloaded.

Hydrostatic vehicle propulsion systems frequently are configured only for two motor propel hydraulic circuits and are not directed to four motor propel hydraulic circuits. The provision of a hydrostatic vehicle propulsion system configured only for two motor propel hydraulic circuits, limits the traction control of these systems as the remaining tires are not propelled and thus have reduced traction capabilities.

Those hydrostatic vehicle propulsion systems configured for four motor propel hydraulic circuits frequently suffer from reduced tractive effort, wheel slippage, and tire scuffing problems. These problems arise as these hydrostatic vehicle propulsion systems configured for four motor propel hydraulic circuits frequently have insufficient circuit design to provide proper traction. Further, these four motor propel hydraulic circuits frequently have very complex valving structures for the control of fluid pressure in the circuits. These complex valving structures add complexity to the systems, which decreases reliability and increases manufacturing and maintenance costs.

It is a primary objective of this invention to provide a hydrostatic vehicle propulsion system consisting of a single, variable fluid displacement pump in conjunction with multiple fluid displacement motors, and a valve system to provide improved traction control functions.

These and other objects will be apparent to those skilled in the art.

BRIEF SUMMARY OF THE INVENTION

The hydrostatic vehicle propulsion system includes a single, variable fluid displacement pump in conjunction with multiple fluid displacement motors, and a valve system to provide traction control functions. The present invention includes a four motor propel hydraulic circuit having a single pump, where fluid passes from the pump to each of the left and right front motors. From the left front motor the fluid passes to the right rear motor and back to the single pump, and from the right front motor the fluid passes to the left rear motor and then back to the single pump. Two oppositely flowing one-way relief valve lines are included in the system. The first relief valve line provides flow from the right rear motor inlet side to the left rear motor inlet side. Likewise, the second relief valve line provides flow from the left rear motor inlet side to the right rear motor inlet side.

DETAILED DESCRIPTION OF THE PREFERRED EMBODIMENT

Figure 1:
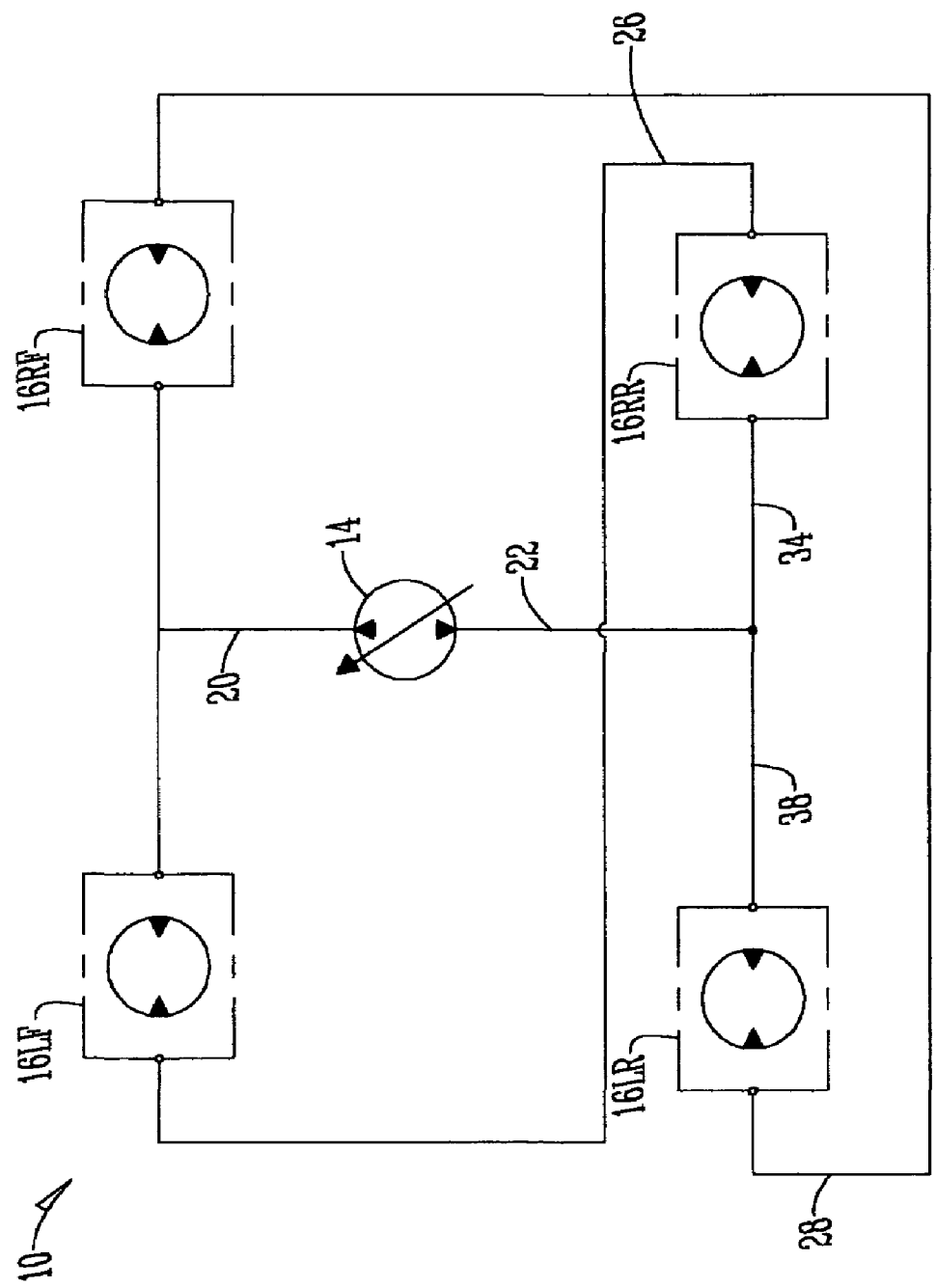
FIG. 1 is a schematic diagram depicting the single pump, multiple motor hydrostatic vehicle propulsion system of the present invention.
Figure 2:
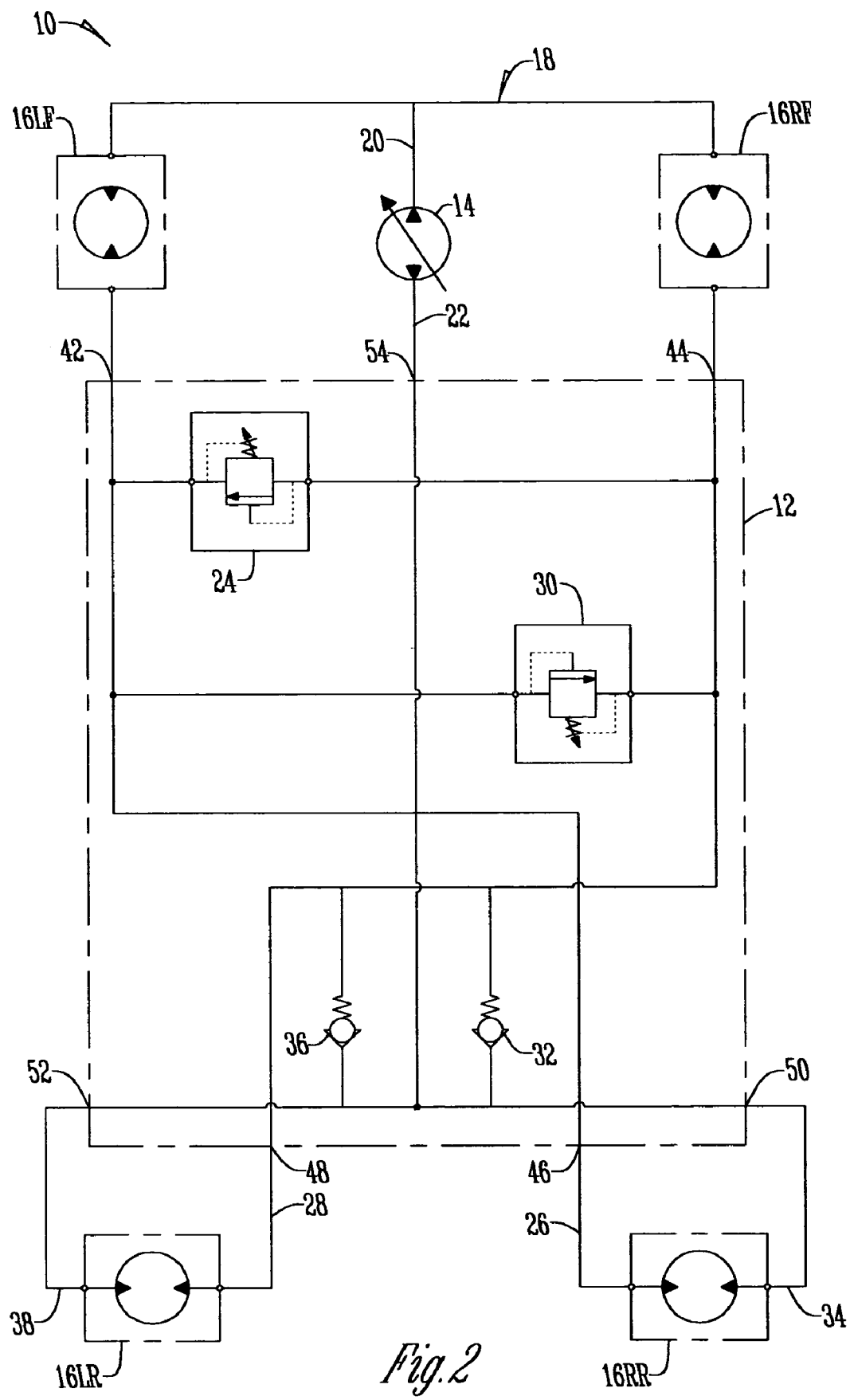
FIG. 2 is a schematic diagram depicting the valve system of the hydrostatic vehicle propulsion system of the present invention.

The schematic diagram of the hydrostatic propulsion system 10 including the traction control valve system 12 of the present invention is shown in FIG. 2. The hydrostatic propulsion system 10 consists primarily of a single variable fluid displacement pump 14, multiple (in this case four) fluid displacement motors 16, and the traction control valve system 12. The pump 14 and motors 16 are fluidly connected in a closed loop hydrostatic circuit 18. Each motor 16 drives a wheel (not shown).

The variable fluid displacement pump 14 is usually driven by an internal combustion engine (not shown). The pump 14 is connected in the hydraulic circuit 18 in a closed parallel/series arrangement with the plurality of fluid displacement motors 16, where the left front and right front motors (16LF and 16RF, respectively) are connected in parallel alignment with the outlet 20 of the pump 14, the left rear and right rear motors (16LR and 16RR, respectively) are connected in parallel with the inlet 22 of the pump 14, the left front motor 16LF is connected in series with the right rear motor 16RR, and the right front motor 16RF is connected in series with the left rear motor 16LR. Thus, fluid passes from the pump 14 to each of the left front and right front motors (16LF and 16RF, respectively). From the left front motor 16 LF the fluid passes to the right rear motor 16RR and back to the single pump 14, and from the right front motor 16RF the fluid passes to the left rear motor 16LR and then back to the single pump 14.

The motors 16 are typically arranged on the vehicle in a manner to position a single motor 16 to power each drive wheel (not shown). The most common configuration is that of a four-wheeled vehicle, thereby incorporating four motors 16 in the hydrostatic propulsion system 10.

The propulsion system 10 supplies motive force to the vehicle when the pump 14 is activated to supply fluid flow to the wheel drive motors 16. The pump 14 is normally capable of providing a bi-directional flow of fluid so that the vehicle can be driven in either forward or reverse directions. As fluid flow is pumped to the motors 16, thereby generating torque at the wheels, the wheels turn and the vehicle moves. Vehicle movement is dependent on the traction interface between the wheels and the ground. If this interface is insufficient to effectively resist the torque output of the wheel, the wheel may spin, a condition also referred to as "loss of traction". In order to eliminate or minimize wheel spin, the traction control valve system 12 is incorporated.

The traction control valve system 12 includes two oppositely flowing one-way relief valve lines 24 and 26 connected to the propulsion system 10. The first relief valve line 24 provides flow from the right rear motor 16RR inlet side 26 to the left rear motor 16LR inlet side 28. Likewise, the second relief valve line 30 provides flow from the left rear motor inlet side 28 to the right rear motor inlet side 24.

Optionally, in certain applications, the traction control valve system 12 includes two over-running check valve lines. The first check valve line 32 provides flow from the right rear motor outlet side 34 to the right rear motor inlet side 26. Likewise, the second check valve line 36 provides flow from the left rear motor outlet side 38 to the left rear motor inlet side 28.

The pump 14, which is typically driven by an internal combustion engine on the vehicle, supplies pressurized fluid to drive motors 16. The vehicle operator controls the fluid displacement of the pump 14 to determine the forward or reverse travel direction of the vehicle and the ground travel speed of the vehicle. The vehicle operator also determines the course of travel that the vehicle follows by controlling the steering angle of the wheels.

The traction control valve system 12 functions to continuously maintain the appropriate fluid flow to each of the motors 16 in the propulsion system 10. The four wheel traction control valve system 12 of the present invention improves the gradeability of a four-wheel drive mower propulsion system 10. The Four Wheel Traction Control Valve System 12 improves tractive effort at each rear wheel, 16LR and 16RR, and provides flow sharing to each side of the parallel/series circuit 18 when the vehicle is in a steering condition. Two relief valves 24 and 30 accomplish these functions. The relief valves 24 and 30 reference inlet pressure at each of the rear wheel motors 16LR and 16RR and optimize the pressure delta between the two motors 16LR and 16RR by sharing flow from one side of the parallel circuit 18 to the other. The maximum allowable pressure delta between the two rear wheel motors 16LR and 16RR is adjustable by changing the pressure setting of the relief valves 24 and 30. The features of the valves 24 and 30 only function in one direction, as shown in FIG. 2.

Figure 3:
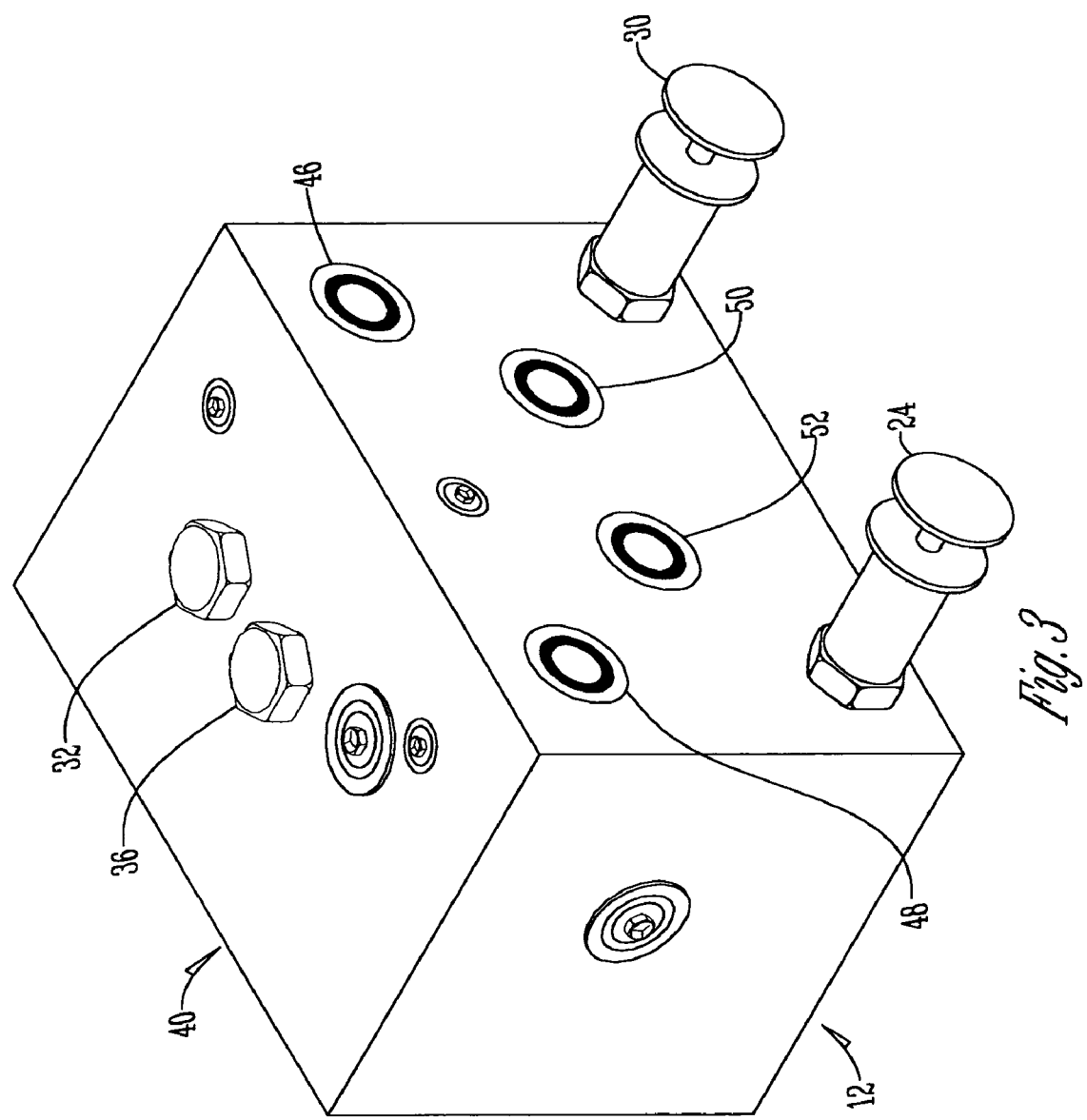
FIG. 3 is a perspective view depicting the valve system of the hydrostatic vehicle propulsion system of the present invention.
Figure 4:
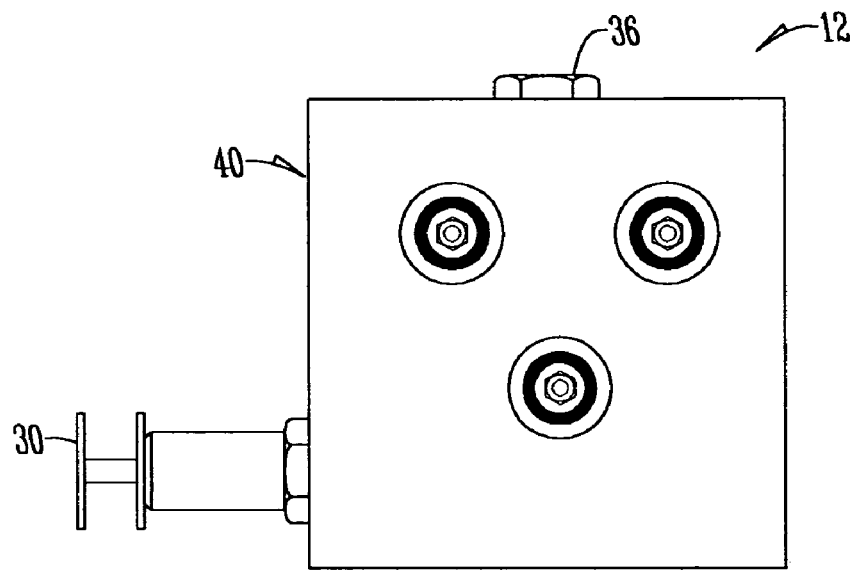
FIG. 4 is an end view of the valve system of the hydrostatic vehicle propulsion system of the present invention.
Figure 5:
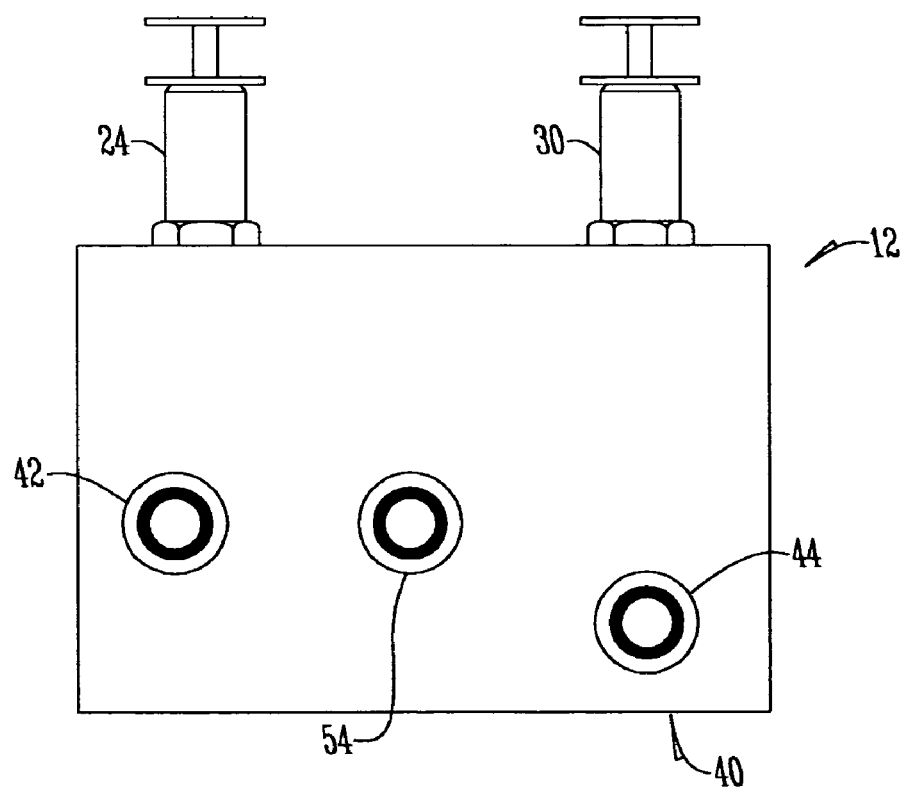
FIG. 5 is a bottom view depicting the valve system of the hydrostatic vehicle propulsion system of the present invention.

The valve system 12 may be produced as seen in FIGS. 3–5. Optionally, other versions of this valve system 12 can be supplied without the "knob adjustment" for the relief valves. For example, the relief valves 24 and 30 could be formed to have a fixed pressure setting. The traction control valve system 12 includes a body 40 with two oppositely flowing one-way relief valve lines 24 and 26 connected to the propulsion system 10 through multiple hydraulic connections. The valve system 12 is connected in the hydraulic circuit 18 with the plurality of fluid displacement motors 16, where the left front motor 16LF is fluidly connected to the valve system 12 via hydraulic connection 42. Likewise, the right front motor 16RF is fluidly connected to the valve system 12 via hydraulic connection 44. The inlet side 26 of the right rear motor 16RR is fluidly connected to the valve system 12 via hydraulic connection 46. In normal operation, fluid will pass from the left front motor 16LF, to the valve system 12 via hydraulic connection 42, and then to the inlet side 26 of the right rear motor 16RR via hydraulic connection 46. The inlet side 28 of the left rear motor 16LR is fluidly connected to the valve system 12 via hydraulic connection 48. In normal operation, fluid will pass from the right front motor 16RF, to the valve system 12 via hydraulic connection 44, and then to the inlet side 28 of the left rear motor 16LR via hydraulic connection 48. During bypass operation, the first relief valve line 24 provides flow from the right rear motor 16RR inlet side 26 to the left rear motor 16LR inlet side 28. Likewise, the second relief valve line 30 provides flow from the left rear motor inlet side 28 to the right rear motor inlet side 24.

The outlet side 34 of right rear motor 16RR is fluidly connected to the valve system 12 via hydraulic connection 50. Likewise, the outlet side 38 of left rear motor 16LR is fluidly connected to the valve system 12 via hydraulic connection 52. The pump inlet 22 of the pump 12 is fluidly connected to the valve system 12 via hydraulic connection 54. In normal operation, fluid will pass from the rear motors 16RR and 16LR, to the valve system 12 via hydraulic connections 50 and 52 respectively, and then to the pump inlet 22 via hydraulic connection 54. During bypass operation, the first check valve line 32 provides flow from the right rear motor 16RR outlet side 34 via hydraulic connection 50 to the right rear motor 16RR inlet side 26 via hydraulic connection 46. Likewise, the second check valve line 36 provides flow from the left rear motor outlet side 38 via hydraulic connection 52 to the left rear motor inlet side 28 via hydraulic connection 48.

In certain applications, the over-running check valves may be unnecessary.

In operation, reduced tractive effort, wheel slippage, and tire scuffing are problems that arise in single pump, four motors, propel, hydraulic circuits without the Four-Wheel Traction Control Valve 12.

If one of the front tire's traction is reduced, the inlet pressure of that drive motor will be reduced. In a parallel circuit, more flow will go to the motor with the least pressure. Due to the circuit 18 layout, the increased flow at the front motor, 16LF for example, would then force the opposite side's rear motor 16RR to also use this increased flow. This can cause these two motors 16LF and 16RR to spin out, thus consuming all available pump 14 flow. The other half of the parallel circuit 18 would not receive any flow to provide torque at either of the other two motors 16RF and 16LR causing reduced tractive effort and wheel slippage.

In tight turning conditions, the outside rear wheel 16LR or 16RR can scuff the turf due to lack of available oil. Due to a four wheel machine's steering geometry, the flow requirements at the outside, rear motor 16LR or 16RR can exceed the amount being provided through the front, inside motor 16LF or 16RF. The flow requirements at the inside, rear motor 16LR or 16RR is smaller than the amount being provided from the outside, front motor 16LF or 16RF.

In a single pump 14, multiple motor 16 propel hydraulic circuit 18 with the Four-Wheel Traction Control Valve System 12, both of the previously mentioned issues are resolved. The valve system 12 helps prevent wheel slippage (loss of traction) by maintaining a similar inlet pressure at each rear wheel motor 16LR or 16RR (second in series). The maximum allowable pressure delta at the rear wheel (second in series) motors 16LR or 16RR will be equal to the relief valve's 24 or 30 pressure setting.

The traction control valve system 12 solves the turf scuffing problem while steering in a similar manner. Two relief valves 24 and 30 control the maximum allowable inlet pressure difference between the two rear motors 16LR or 16RR. For example, if the machine is in a steering condition, the machine's outside motors require more flow than the inside motors. When the higher flow from an outside corner's front motor is trying to be forced to a rear inside motor that has lower flow requirements, pressure builds in the line between the front and the rear motor until it reaches the set point of the relief valve 24 or 30. The relief valve 24 or 30 would then open and dump the excess flow to the other motor. The amount of pressure allowed to build in the line between the front and rear motor is determined by the relief valve's 24 or 30 pressure setting.

It will be appreciated by those skilled in the art that other various modifications could be made to the device without the parting from the spirit in scope of this invention. All such modifications and changes fall within the scope of the claims and are intended to be covered thereby.

What is claimed is:

1. A traction control valve system for use with a hydrostatic circuit fluidly connecting a pump and four motors in a closed loop parallel/series arrangement, where left front and right front motors are connected in parallel with an outlet of the pump, left rear and right rear motors are connected in parallel with an inlet of the pump, the left front motor is connected in series with the right rear motor, and the right front motor is connected in series with the left rear motor, comprising:

first and second oppositely flowing one-way relief valve lines adapted to connect to the hydrostatic circuit; and
   wherein below a threshold pressure the first relief valve line is closed so that the traction control valve system passes fluid from the left front motor to the inlet side of the right rear motor;
   wherein below the threshold pressure the second relief valve line is closed so that the traction control valve system passes fluid from the right front motor to the inlet side of the left rear motor;
   wherein above the threshold pressure the first relief valve line is open so that the traction control valve system passes fluid from the right rear motor inlet side to the left rear motor; and
   wherein above the threshold pressure the second relief valve line is open so that the traction control valve system passes fluid from the left rear motor inlet side to the right rear motor inlet side.

2. The traction control valve system of claim 1, wherein the traction control valve system includes a body connected to the two oppositely flowing one-way relief valve lines, wherein the first and second oppositely flowing one-way relief valve lines are adapted to connect to the hydrostatic circuit through multiple hydraulic connections located on the body.

3. The traction control valve system of claim 2, further comprising:

a first hydraulic connection located on the body is adapted to fluidly connect to the left front motor;
   a second hydraulic connection located on the body is adapted to fluidly connect to the right front motor;
   a third hydraulic connection located on the body is adapted to fluidly connect to the inlet side of the right rear motor; and
   a fourth hydraulic connection located on the body is adapted to fluidly connect to the inlet side of the left rear motor.

4. The traction control valve system of claim 3, further comprising:

a fifth hydraulic connection located on the body is adapted to fluidly connect to the outlet side of right rear motor;
   a sixth hydraulic connection located on the body is adapted to fluidly connect to the outlet side of left rear motor; and
   a seventh hydraulic connection located on the body is adapted to fluidly connect to a pump inlet of the pump.

5. The traction control valve system of claim 4, wherein the first check valve line is closed so that the traction control valve system will pass fluid from the outlet side of right rear motor via the fifth hydraulic connection to the pump inlet via the seventh hydraulic connection; the second check valve line is closed so that the traction control valve system will pass fluid from the outlet side of left rear motor via the sixth hydraulic connection to the pump inlet via the seventh hydraulic connection; the first check valve line is open at high pressure so that the traction control valve system will pass fluid from the right rear motor outlet side via the fifth hydraulic connection to the right rear motor inlet side via the third hydraulic connection; and the second check valve line is open at high pressure so that the traction control valve system will pass fluid from the left rear motor outlet side via the sixth hydraulic connection to the left rear motor inlet side via the fourth hydraulic connection.

6. The traction control valve system of claim 1, wherein the traction control valve system includes first and second over-running check valve lines adapted to connect to the hydrostatic circuit.

7. The traction control valve system of claim 6, wherein the first check valve line provides flow from an outlet side of the right rear motor to an inlet side of the right rear motor, and the second check valve line provides flow from an outlet side of the left rear motor to an inlet side of the left rear motor.

* * * * *